United States Patent
Balasubramanian et al.

(10) Patent No.: US 9,411,361 B2
(45) Date of Patent: Aug. 9, 2016

(54) FREQUENCY DIVISION CLOCK ALIGNMENT USING PATTERN SELECTION

(71) Applicant: Cavium, Inc., San Jose, CA (US)

(72) Inventors: Suresh Balasubramanian, Shrewsbury, MA (US); Steve Aiken, Pepperell, MA (US); Georgios Faldamis, Somerville, MA (US)

(73) Assignee: Cavium, Inc., San Jose, CA (US)

( * ) Notice: Subject to any disclaimer, the term of this patent is extended or adjusted under 35 U.S.C. 154(b) by 89 days.

(21) Appl. No.: 14/542,216

(22) Filed: Nov. 14, 2014

(65) Prior Publication Data
US 2016/0142067 A1    May 19, 2016

(51) Int. Cl.
*G06F 1/08*    (2006.01)
*G06F 1/12*    (2006.01)
*G06F 1/10*    (2006.01)

(52) U.S. Cl.
CPC .. *G06F 1/08* (2013.01); *G06F 1/10* (2013.01); *G06F 1/12* (2013.01)

(58) Field of Classification Search
CPC ............... G06F 1/04; G06F 1/08; G06F 1/10; G06F 1/12; H03L 7/24
See application file for complete search history.

(56) References Cited

U.S. PATENT DOCUMENTS

| 6,473,476 | B1 | 10/2002 | Banks |
| 7,005,907 | B2 * | 2/2006 | Ibuka ........................ G06F 1/10 327/156 |
| 7,272,743 | B2 * | 9/2007 | Oikawa ..................... G06F 1/10 375/354 |
| 7,301,385 | B2 * | 11/2007 | Takano ...................... G60F 1/10 327/292 |
| 7,532,077 | B2 | 5/2009 | Wang et al. |
| 7,622,965 | B2 | 11/2009 | Scoville |
| 7,809,971 | B2 * | 10/2010 | Shimobeppu ............. G06F 1/10 327/156 |
| 2012/0206178 | A1 | 8/2012 | Balasubramanian |

* cited by examiner

*Primary Examiner* — Patrick O'Neill
(74) *Attorney, Agent, or Firm* — Occhiuti & Rohlicek LLP

(57) ABSTRACT

Generating a clock signal includes: at a root node of a clock distribution network, receiving a first clock signal generated based on a reference clock signal; at a first leaf node, detecting a reference event associated with the reference clock signal and generating a synchronizing signal; passing the synchronizing signal from the first leaf node to the root node; at the root node, generating a second clock signal from the first clock signal synchronized to the synchronizing signal, and distributing the second clock signal to the leaf nodes. Generating the second clock signal includes selecting a repeating pattern of cycles of the first clock signal including fewer than all of the cycles of the first clock signal, and at least every cycle of the first clock signal that is shifted in time by a propagation delay with respect to a rising edge of the reference clock signal.

16 Claims, 5 Drawing Sheets

FREQUENCY DIVISION CLOCK ALIGNMENT USING PATTERN SELECTION

BACKGROUND

This invention relates to clock signal generation for an integrated circuit.

A clock on an integrated circuit is often distributed over a network that imposes a significant delay to the clock, but that yields synchronization of the distributed clock at remote nodes of the network. For example, a tree structure may be used for such clock distribution. In some systems, the clock is generated such that it is synchronized with an external reference clock at the leaves of the network.

It may be desirable to divide the clock to reduce the clocking rate of circuitry, for example, to reduce power consumption. However, such clock frequency division may result in the clock not being suitably synchronized with the external clock reference.

SUMMARY

In a general aspect, an approach to generating a clock signal can provide the ability to divide the frequency of a clock while maintaining suitable synchronization with an external clock reference.

In one aspect, in general, a method for generating a clock signal includes, at a root node of a clock distribution network, receiving a first clock. At a first leaf node of a plurality of leaf nodes of the clock distribution network, a reference event is detected and a synchronizing signal is generated based on the detection of the reference event. The synchronizing signal is passed along a synchronizing signal path from the first leaf node to the root node via one or more clocked storage cells, each storage cell being clocked from a corresponding point within the clock distribution network. At the root node, a second clock is generated from the first clock synchronized to the synchronizing signal received at the root node. The second clock at the root node is synchronized to the synchronizing signal with a shift in time between corresponding edges that represents a propagation delay through the clock distribution network. The second clock is distributed to the leaf nodes of the clock distribution network. The generating of the second clock results in the second clock received at the first leaf node being synchronized to the detected reference event. The second clock at the first leaf node is synchronized to a signal that caused the reference event without any sift in time between corresponding edges.

In another aspect, in general, circuitry for generating a clock signal includes a clock divider having an output coupled to a root node of a clock distribution network having clock distribution paths to a plurality of leaf nodes for distributing a clock signal to the leaf nodes. A synchronizing signal generator is coupled to a first leaf node of the plurality of leaf nodes of the clock distribution network. A synchronizing signal path from the first leaf node to the root node is used for passing a synchronizing signal from the first leaf node to the root node. The synchronizing signal path includes one or more clocked storage cells each having a clock input coupled along a clock distribution path of the clock distribution network from the root node to the first leaf node. The synchronizing signal generator has an output coupled to an input of the synchronizing signal path and includes a reference event detection circuit for generating the synchronizing signal. The clock divider includes an input for receiving a generated clock and an input coupled to the synchronizing signal path, and includes a divided clock generator configured to generate a divided clock from the received generated clock synchronized to the synchronizing signal received via the synchronizing signal path.

In another aspect, in general, a non-transitory computer readable medium storing a data structure which is operated upon by a program executable on a computer system, the program operating on the data structure to perform a portion of a process to fabricate an integrated circuit including circuitry described by the data structure, the circuitry described in the data structure including some or all of the circuitry for generating a clock signal referenced above.

In another aspect, in general, a method for generating a clock signal includes: at a root node of a clock distribution network, receiving a first clock signal generated based on a reference clock signal; at a first leaf node of a plurality of leaf nodes of the clock distribution network, detecting a reference event associated with the reference clock signal and generating a synchronizing signal based on the detection of the reference event; passing the synchronizing signal from the first leaf node to the root node; at the root node, generating a second clock signal from the first clock signal synchronized to the synchronizing signal received at the root node, and distributing the second clock signal to the leaf nodes of the clock distribution network, the generating of the second clock signal including selecting a repeating pattern of cycles of the first clock signal, wherein the repeating pattern includes fewer than all of the cycles of the first clock signal, and at least every cycle of the first clock signal that is shifted in time by a propagation delay with respect to a rising edge of the reference clock signal or every cycle of the first clock signal that is shifted in time by a propagation delay with respect to a falling edge of the reference clock signal.

Aspects can include one or more of the following features.

Detecting the reference event includes detecting a rising edge of said reference clock signal or detecting a falling edge of said reference clock signal.

Generating the second clock signal from the first clock signal includes selecting a repeating pattern of cycles of the first clock signal wherein the repeating pattern is synchronized to the received synchronizing signal, the repeating pattern having a length equal to a length of the number of consecutive cycles of the first clock signal in each cycle of the reference clock signal.

The second clock signal received at the first leaf node has an edge aligned with every rising edge of the reference clock signal or aligned with every falling edge of the reference clock signal.

Generating the second clock signal from the first clock signal includes selecting a repeating pattern of cycles of the first clock signal, wherein the repeating pattern is synchronized to the received synchronizing signal, the repeating pattern having a length N.

Generating the second clock signal includes accepting an input representing a division factor M and determining the repeating pattern of cycles according to the division factor such that a rate of the second clock signal is approximately a rate of the first clock signal divided by the division factor.

The rate of the second clock signal corresponds to a number of rising edges in the repeating pattern of cycles or a number of falling edges in the repeating pattern of cycles divided by the time duration of the repeating pattern of cycles.

Generating the second clock signal comprises setting a counter to a first value upon receipt of the synchronizing signal, and clocking the counter using the first clock signal in a cyclic sequence of count values, each cycle of length N.

In another aspect, in general, circuitry for generating a clock signal includes: a clock generator having an output that provides a generated clock signal that is generated based on a reference clock signal; a clock divider having an input coupled to the output of the clock generator and an output coupled to a root node of a clock distribution network having clock distribution paths to a plurality of leaf nodes for distributing a divided clock signal to the leaf nodes; a synchronizing signal generator coupled to a first leaf node of the plurality of leaf nodes of the clock distribution network; and a synchronizing signal path from the first leaf node to the root node for passing a synchronizing signal from the first leaf node to the root node; wherein the synchronizing signal generator has an output coupled to an input of the synchronizing signal path and includes a reference event detection circuit for generating the synchronizing signal in response to a reference event associated with the reference clock signal; and wherein the clock divider includes an input coupled to the synchronizing signal path, and includes a divided clock generator configured to generate the divided clock signal from the generated clock signal by selecting a repeating pattern of cycles of the generated clock signal, wherein the repeating pattern includes fewer than all of the cycles of the generated clock signal, and at least every cycle of the generated clock signal that is shifted in time by a propagation delay with respect to a rising edge of the reference clock signal or every cycle of the generated clock signal that is shifted in time by a propagation delay with respect to a falling edge of the reference clock signal.

Aspects can include one or more of the following features.

The reference event includes a rising edge of said reference clock signal or a falling edge of said reference clock signal.

Generating the divided clock signal from the generated clock signal includes selecting a repeating pattern of cycles of the generated clock signal wherein the repeating pattern is synchronized to the synchronizing signal, the repeating pattern having a length equal to a length of the number of consecutive cycles of the generated clock signal in each cycle of the reference clock signal.

The divided clock signal received at the first leaf node has an edge aligned with every rising edge of the reference clock signal or aligned with every falling edge of the reference clock signal.

Generating the divided clock signal from the generated clock signal includes selecting a repeating pattern of cycles of the generated clock signal, wherein the repeating pattern is synchronized to the received synchronizing signal, the repeating pattern having a length N.

Generating the divided clock signal includes accepting an input representing a division factor M and determining the repeating pattern of cycles according to the division factor such that a rate of the divided clock signal is approximately a rate of the generated clock signal divided by the division factor.

The rate of the divided clock signal corresponds to a number of rising edges in the repeating pattern of cycles or a number of falling edges in the repeating pattern of cycles divided by the time duration of the repeating pattern of cycles.

Generating the divided clock signal comprises setting a counter to a first value upon receipt of the synchronizing signal, and clocking the counter using the generated clock signal in a cyclic sequence of count values, each cycle of length N.

Aspects can have one or more of the following advantages.

Frequency division of a clock (GCLK) can be achieved while maintaining the alignment to an external reference clock (REF), which is running at an integer submultiple of the GCLK frequency.

Other features and advantages of the invention will become apparent from the following description, and from the claims.

DESCRIPTION

Figure 1:
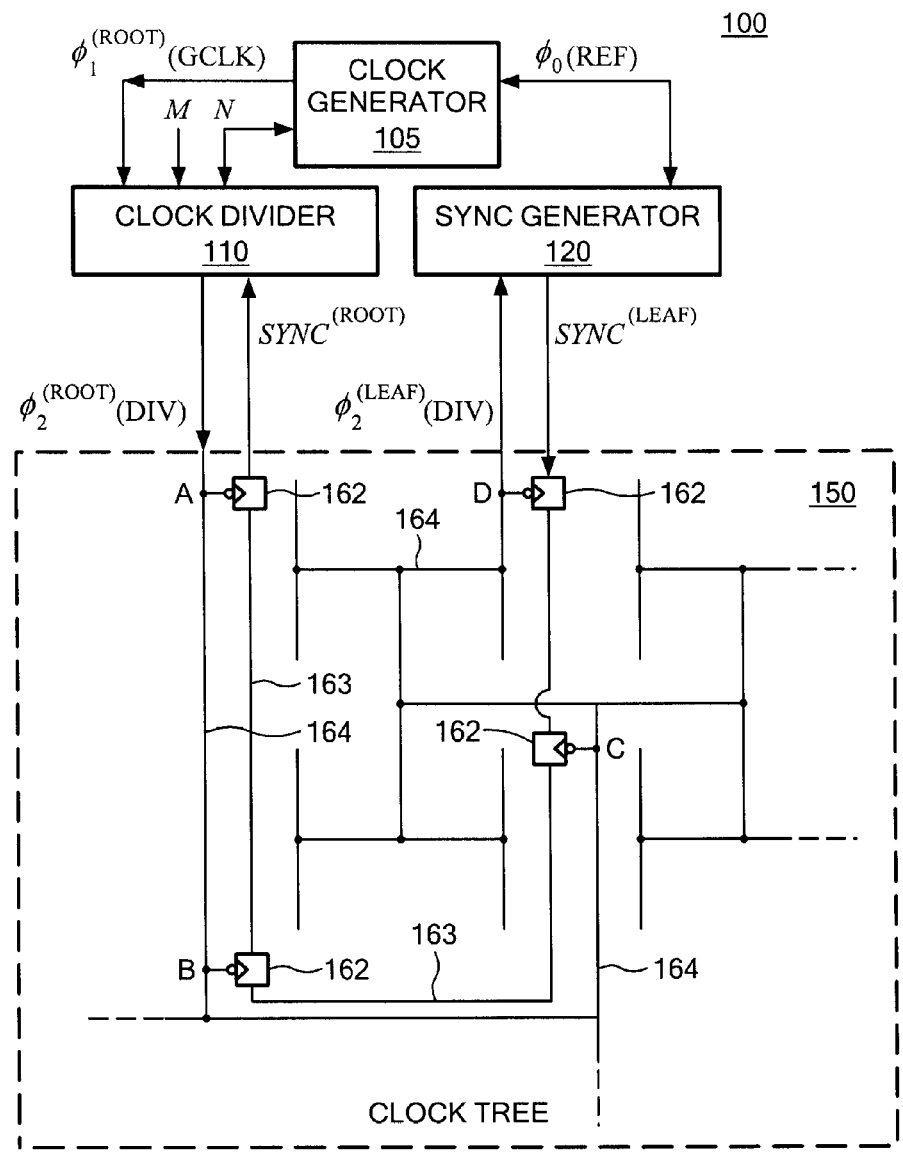
FIG. 1 is a block diagram of a clock generation system.

Referring to FIG. 1, a clock generation system 100 for an integrated circuit generates various clock signals (or simply "clocks") that exhibit synchronization characteristics that may be useful (or required) for operation of the integrated circuit. The system 100 makes use of a reference clock (REF, also referred to below as $\phi_0$), which may be provided externally to the integrated circuit. This reference clock is used by a clock generator 105 to generate a derived clock (GCLK, also referred to below as $\phi_1$) with N times the clock rate of the reference clock. A clock divider 110 either passes the derived clock $\phi_1$ without modification or after clock division according to a factor M as to its output. The approach to clock division is described in detail below. The divided clock output (DIV, also referred to below as $\phi_2$) of the clock divider 110 is passed to a clock distribution network, in this illustration in FIG. 1 a clock tree 150, which distributes the divided clock to the leaves of the clock tree. Is should be recognized that a tree is only one possible form of distribution network and other structures of network can be used. In general, the propagation time from the root to the leaves of the clock tree 150 can be more than one clock cycle, and for a balanced clock tree 150 the propagation times from the root to the leaves of the clock tree 150 are substantially equal. The clock generator 105, for example, uses a Phase-Locked Loop (PLL) approach and compensates for the delay through the clock tree. In some implementations, the delay compensation can be performed using a Delay-Locked Loop (DLL) connected to the output of the PLL. This delay is tuned such that the clock generator 105 causes the rising edge of the reference clock ($\phi_0$) at a leaf to be aligned with the rising edge of the clock signal $\phi_2^{(LEAF)}$ at the leaf when there is no clock division. That is, if M=1, and therefore $\phi_2^{(ROOT)}=\phi_1^{(ROOT)}$ at the root (as indicated by the superscript "(ROOT)") of the clock tree 150, at the leaf each the rising edge of distributed clock $\phi_2^{(LEAF)}$ is aligned with the rising edge of the $\phi_0$. While the synchronization procedures are described herein with respect to a particular leaf, it is understood that synchronization may be attained at each of multiple leaves to the extent that the timing of the reference clock $\phi_0$ is substantially the same at each leaf.

In some situations, it is desirable to divide the distributed clock by a factor M, for example, to reduce power consumption of clocked circuitry. If N is a multiple of M, and the $\phi_2^{(ROOT)}$ were generated from $\phi_1^{(ROOT)}$ according to a division by M that is achieved by passing every $M^{th}$ clock pulse, then it is possible that each rising edge of $\phi_2^{(LEAF)}$ would be aligned with the rising edge of the $\phi_0$ at the leaves of the clock tree, but it is also possible that the rising edges of $\phi_0$ would never be aligned with a rising edge of $\phi_2^{(LEAF)}$. Furthermore, if N is not a multiple of M, then division by M may result in some rising edges of $\phi_0$ being aligned with a rising edge of $\phi_2^{(LEAF)}$, and some not. Clock divider 110 implements an approach that guarantees that for any M≠1 the derived clock $\phi_2^{(LEAF)}$ has a clock pulse aligned with each cycle of the reference clock, and more particularly in this embodiment, that $\phi_2^{(LEAF)}$ has a rising edge aligned with each rising edge of the reference clock $\phi_0$.

Figure 2:
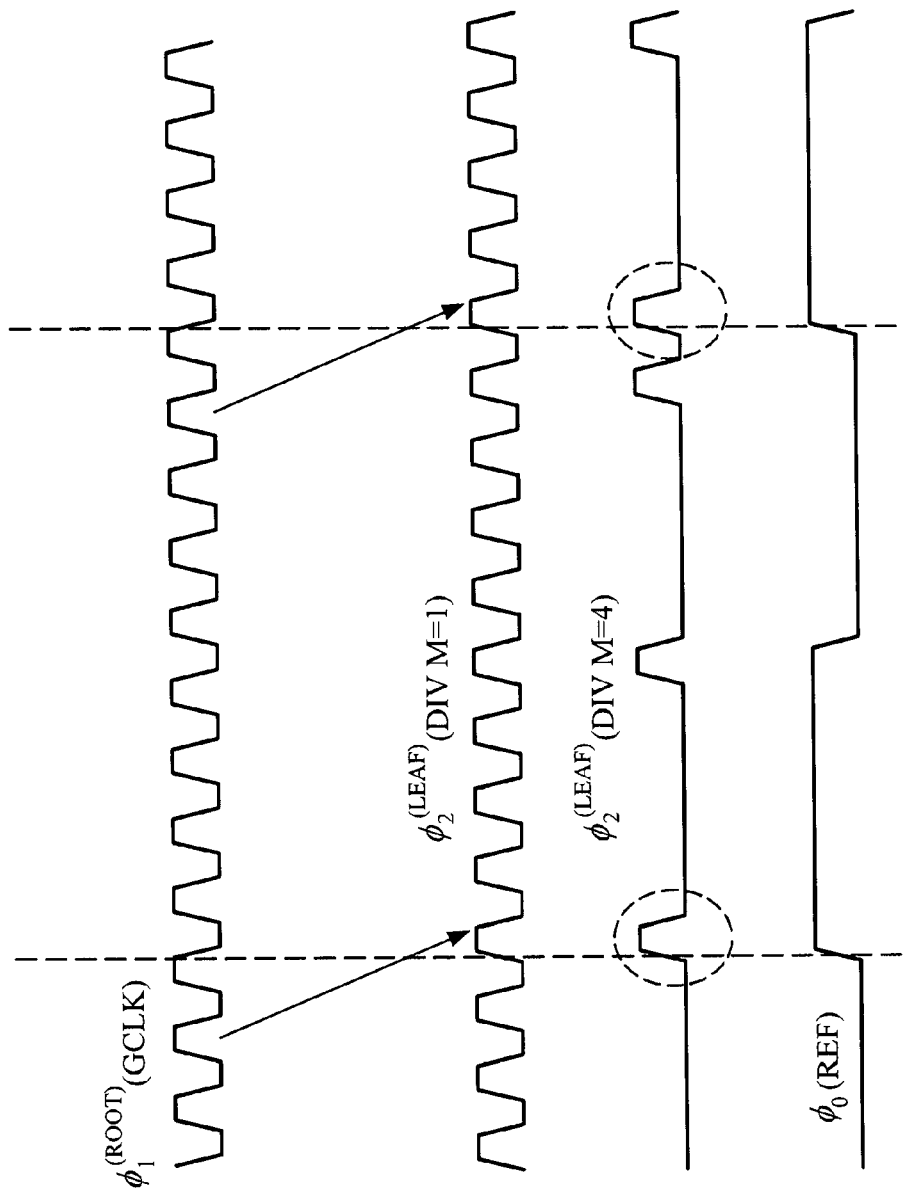
FIG. 2 is a timing diagram of clocks in the system of FIG. 1.

Referring to FIG. 2, a situation in which N=9 is illustrated such that there are N=9 clock periods of $\phi_1$ for every period of $\phi_0$. Note that in practice, the value of N may be much larger, for example, N=50, while N=9 is chosen for here for illustration. In the case that there is no clock division (M=1), the clock at the leaf, $\phi_2^{(LEAF)}$ (DIV M=1) is simply a delayed version of the generated clock at the root, $\phi_1^{(ROOT)}$. In this illustration, the delay through the clock tree 150 is approximately 1.2 clock periods $T_1$ of the generated clock $\phi_1$. As illustrated by the dotted lines in FIG. 2, each rising edge of the reference clock $\phi_0$ (occurring at the times at which they would occur at the synchronized leaf of the clock tree 150) is aligned with the rising edge of a clock pulse of $\phi_2^{(LEAF)}$ (DIV M=1).

For M≠1, operation of the clock divider 110 can be understood by the illustration of a division by M=4. The system 100 is configured, as described in more detail below, to enable the clock divider 110 to generate a periodic output signal that has most rising edges occurring at a divided frequency, and retains additional pulses whose rising edges are synchronized with the reference clock $\phi_0$, which does not sacrifice a desired power savings of operation at the lower divided frequency. In this case, $\phi_2^{(LEAF)}$ (DIV M=4) has a clock pulse aligned with each rising edge of $\phi_0$ (these pulses are indicated by dashed circles), and other pulses separated by no more than M−1=3 inhibited pulses. In this example, if the cycles of the an undivided clock (GCLK) are numbered 0, 1, 2, . . . , 7, 8, 0, 1, 2, such that cycle 0 of the undivided but delayed clock at the leaf $\phi_2^{(LEAF)}$ (DIV M=1) is aligned with the reference clock $\phi_0$ rising edge, clock pulses 0, 4, 8, 0, 4, . . . of $\phi_1^{(ROOT)}$ are selected (i.e., retained) and the others are inhibited to form $\phi_2^{(ROOT)}$ at the root. The clock divider 110 generates the clock $\phi_2^{(ROOT)}$ both to have such a pattern, and also to ensure that the corresponding pattern at the leaf $\phi_2^{(LEAF)}$ (DIV M=4) is aligned with (i.e., has coincident rising edges with) the reference clock $\phi_0$ at the leaf. For example, a misaligned sequence that retained pulses 2, 6, 1, 2, . . . would not be suitable.

The clock divider 110 does not simply make use of $\phi_0$ at the root to properly align the divided clock pattern. Rather, a sync generator 120 coupled to at least one leaf detects a rising edge of $\phi_0$ at the leaf and generates a synchronization signal at the detected time at the leaf. This synchronizing signal is propagated to the clock divider 110 at the root of the clock tree along a synchronizing signal path. The synchronizing signal path for propagating the synchronization signal from the leaf to the root of the tree may include a series of clocked storage cells (e.g., flip flops), such that the propagation of the synchronization signal takes a fixed number cycles of the clock being distributed over the clock tree. Generally, the clock divider 110 makes use of knowledge of this fixed number of cycles, and the factors M and N, to select pulses of the generated clock $\phi_1^{(ROOT)}$ to form $\phi_2^{(ROOT)}$, such that after propagation $\phi_2^{(LEAF)}$ is aligned as desired with the reference clock $\phi_0$. Alternatively, in some implementations, if the propagation delay over the path from the root to the leaf of the clock distribution network is less a full period $T_1$ of the generated clock $\phi_1$, then it may be possible to provide a synchronizing signal path without any clocked storage cells.

Referring back to FIG. 1, the synchronizing signal path of a synchronizing signal SYNC$^{(LEAF)}$ at a leaf of the clock tree 150 to yield a synchronizing signal SYNC$^{(ROOT)}$ passes through a number of flip-flops 162, and over clock distribution lines 164 linking the flip-flops. In FIG. 1, there are K=4 flip-flops 162 on the path from the leaf to the root. In this example, these flip-flops are clocked on the negative edge of the clock signals at respective points (A, B, C, D) along the distribution lines 164. Note that the flip-flops are arranged along a clock path from the root to the leaf of the clock tree 150 (or at points in the distribution network with equivalent delay from the root node), and therefore due to the propagation delay of the clock signal, are clocked in succession. Of course, any of a variety of implementations could be used in which various digital circuitry, such as the flip-flops 162, are clocked on the positive edges instead of the negative edges, or on the negative edges instead of the positive edges, as long as the entire system 100 is designed consistently to use the appropriate clock edges at the appropriate locations.

Figure 3:
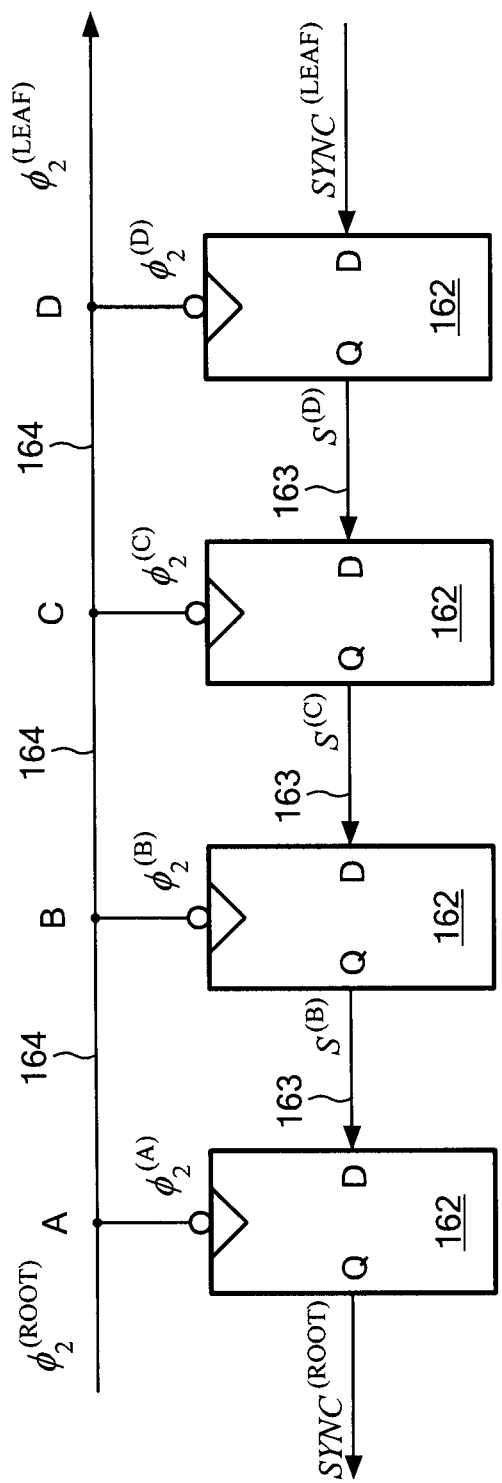
FIG. 3 is a schematic of a synchronizing signal path.

Referring to FIG. 3, the K=4 flip-flops 162, are illustrated in schematic form with the clock distribution lines 164 separating the flip-flops 162. In this example, the propagation delay along each of the lines 164 is about 40% of a period of $\phi_1$, such that the total delay from the root to the leaf of the clock distribution network is about 1.2 times the period of $\phi_1$. A more precise constraint on the relationship between the period of $\phi_1$ and the propagation times along lines 164 between the flip-flops 162 is discussed below.

Figure 4:
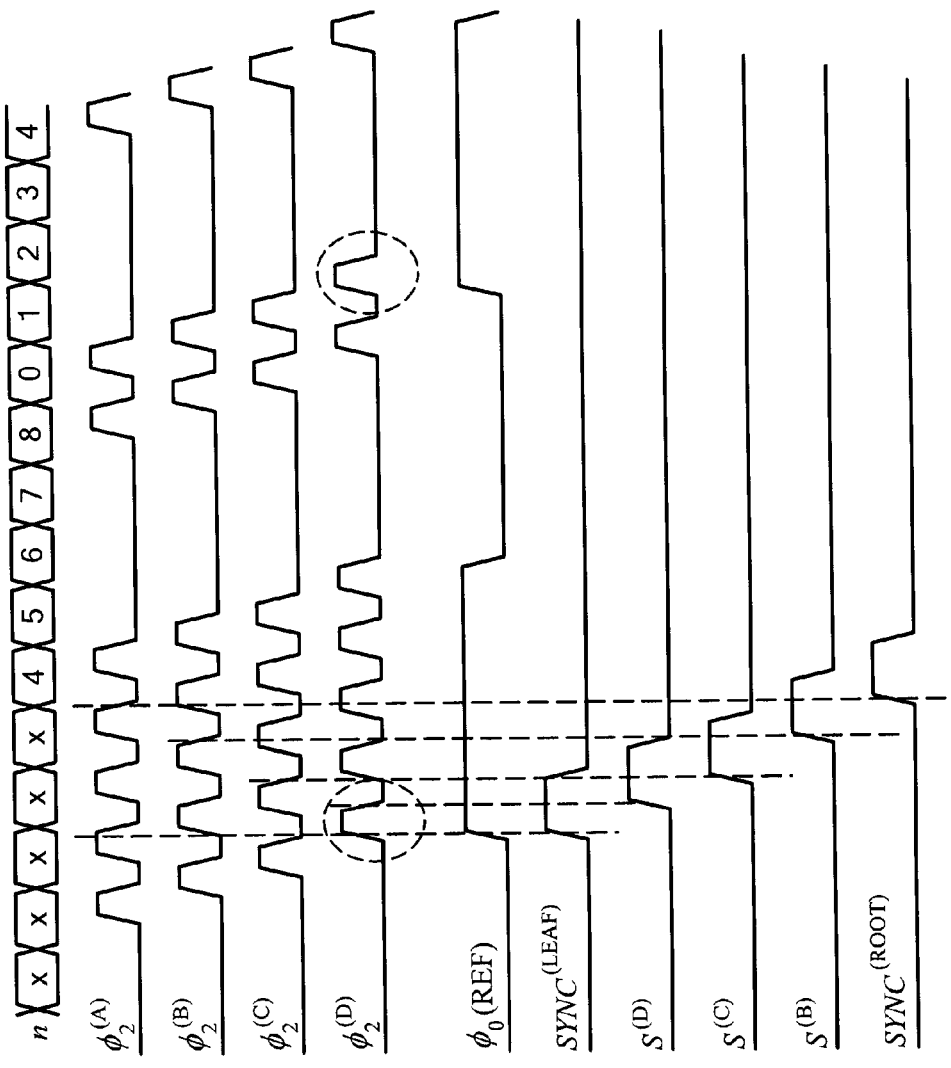
FIG. 4 a timing diagram of signals in the system of FIGS. 1 and 3.

Referring to FIG. 4, a transition from an undivided clock (M=1) to a divided clock (M=4) is illustrated. During the undivided phase, $\phi_2^{(ROOT)}=\phi_1^{(ROOT)}$ is generated such that after propagation through the clock distribution network, $\phi_2^{(LEAF)}$ is aligned with $\phi_0$, as indicated by the left-most dotted vertical line. When the clock divider 110 receives an input to make a transition to M=4 clock division, it continues to pass each clock pulse of $\phi_1^{(ROOT)}$ as the divided clock $\phi_2^{(ROOT)}$ until it receives a synchronizing signal from the leaf. The clock divider 110 ignores subsequent synchronizing signals it receives until the division factor M is again changed. Alternatively, there may be an explicit signal that enables and disables the division even without the division factor M changing. When division is disabled, the undivided clock would again be provided.

At the leaf, the sync generator 120 generates a synchronizing signal SYNC$^{(LEAF)}$ at the first clock pulse of the received clock $\phi_2^{(LEAF)}$ after it detects the rising edge of the reference clock $\phi_0$. This synchronizing signal is passed through the series of flip-flops 162 that are illustrated in FIG. 3 and in FIG. 1. Continuing to refer to FIG. 4, with the flip-flops 162 clocked on the falling edges of the clock signal in the clock distribution network, the synchronizing signal propagates back to the root. Note that at the root, the synchronizing signal SYNC$^{(ROOT)}$ is asserted K=4 clock cycles after the clock pulse of $\phi_0^{(ROOT)}$ that after propagation to the leaf was aligned with $\phi_0$. Therefore, after the arrival of the synchronizing signal at the root, there remain N−K=9−4=5 cycles before the next clock pulse of $\phi_1^{(ROOT)}$ that would propagate through the clock distribution network to be synchronized with $\phi_0$. Generally, the clock divider 110 uses the arrival of the synchronizing signal at the root of the clock tree to initialize a cyclic counter (i.e., counting in a cycle of length N), with count n. The count sequence is illustrated in FIG. 4. In this embodiment, the counter is initialized at n=K, and then increments the counter K, K+1, . . . , N−1, 0, 1, . . . on the negative edges of $\phi_1^{(ROOT)}$. Clock pulses of $\phi_2^{(ROOT)}$ generated at n=0 propagate to the leaf of the tree to be aligned with the rising edge of $\phi_0$. Therefore, the clock divider 110 decodes the counter value n to select pulses of the generated clock $\phi_1^{(ROOT)}$ at n=0 as well as at intervals n=M, 2M, . . . etc for n<N. For the case of N=9 and M=4, the clock divider 110 selects the clock pulses at n=0, 4, and 8. Reversion to an undivided clock (M=1) is performed by the clock divider 110 by again passing all the pulses of $\phi_1^{(ROOT)}$ until it yet again receives a signal to divide the clock.

Figure 5:
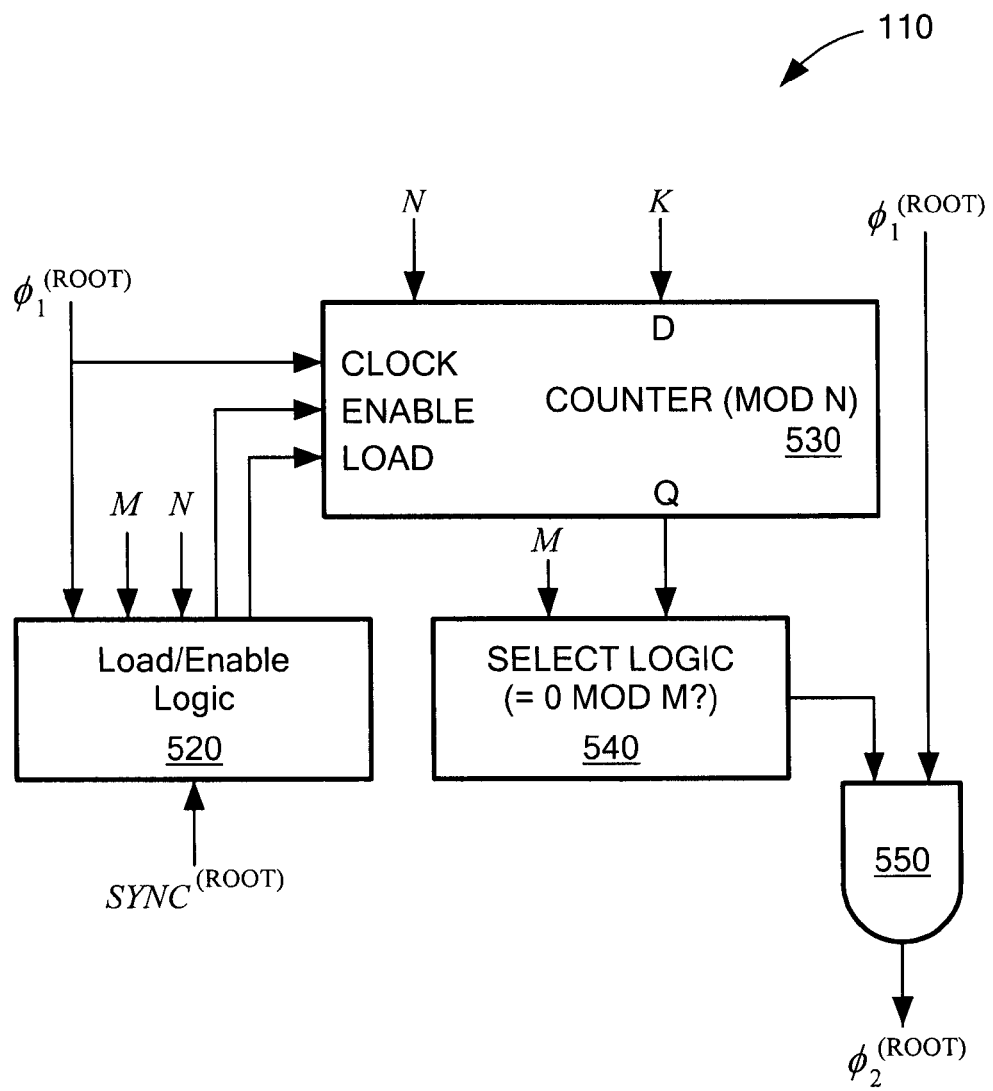
FIG. 5 is a block diagram of a implementation of a clock divider.

Referring to FIG. 5, one of many alternative implementations of the clock divider 110 is shown. Load/enable logic is responsive to the SYNC$^{(ROOT)}$ signal from the leaf to assert a load input of a mod N counter 530 thereby initializing the counter to K as discussed above and enable the counter after the receiving the synchronizing signal. Select logic 540 uses the count output of the counter 530 to generate a select signal that is passed to an AND gate 550. The AND gate selects the pulses of the clock $\phi_1^{(ROOT)}$ to generate the divided clock $\phi_2^{(ROOT)}$. Note that alternative implementations of the clock divider do not necessarily use a counter while maintaining the same function. For example, rather than a counter, a shift register, multiple counters (e.g., one with a cycle of length N and one with a cycle of length M) or an arrangement of flip-flops can be used to generate a select signal that passes the selected pulses of $\phi_1^{(ROOT)}$.

Note that the approach above does not depend on the specific period of $\phi_1$. For example, if the period of $\phi_1$ is doubled, then instead of the delay through the example clock tree 150 of FIG. 1 being 1.2 periods, the delay would be 0.6 periods. However, the propagation of the synchronizing signal would nevertheless take K=4 periods to propagate from the leaf to the root. Therefore, correct operation is maintained. The clock period of $\phi_1$ can be reduced subject to a timing constraint that can be understood with reference to FIG. 3. Consider for example a falling edge of $\phi_2$ passing point "A" at time 0. The flip-flop at point "B" will be clocked at the propagation delay from point "A" to point "B" along path 164. There is then a clock-to-Q delay for the flip-flop 162, and a propagation delay from the output (Q) of the flip-flop 162 to the input (D) of the next flip-flop 162. The input needs to be setup for at least the minimum setup time for the flip-flop. This must all happen before the next falling edge of the $\phi_2$ clock at point "A", which occurs at time $T_2$, the period of $\phi_2$. Generally, there are the following constraints.

Setup Constraint:

$T_2 >$ (clock propagation time between flip-flops along path 164 + clock-to-$Q$ delay of flip-flop 162 + signal propagation time between flip-flops + setup time for $D$ input of flip-flop 162)

Hold Constraint (Typically Independent of Clock Frequency):

(clock propagation time between flip-flops along path 164 + clock-to-$Q$ delay of flip-flop 162 + signal propagation time between flip-flops) > hold time for D input of flip-flop 162

In general, N will be greater than K. However, this is not required as instead if initializing the counter n at K as described above, it can be initialized at K mod N to achieve the required alignment. Also, the approach is not dependent on a particular delay through the clock distribution network remaining stable. As long as the constraint on the period $T_2$ is maintained, then the approach continues to function correctly even if the clock delay changes, for example, due to power of environmental (e.g., temperature) changes.

It should be understood that although discussed in the context of generating a divided clock $\phi_2$ to be aligned with a reference clock $\phi_0$, the approach can be applied to a variety of situations in which a clock $\phi_2^{(ROOT)}$ must be generated so that after propagation over a delay path is synchronized to an reference event that is detected at the end of the delay path. The rising or falling edge of a reference clock is but one example of a reference event to which the clock is to be synchronized. Furthermore, clock division is but one example of the type of clock that can be synchronized with the reference event using the approaches described above.

In some implementations, a computer accessible storage medium includes a database representative of the system 100. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 100. The netlist may then be placed and routed to produce a data set describing geometric shapes to be applied to masks. The masks may then be used in various semiconductor fabrication steps to produce a semiconductor circuit or circuits corresponding to the system 100. In other examples, the database may itself be the netlist (with or without the synthesis library) or the data set.

Other embodiments are within the scope of the following claims.

What is claimed is:

1. A method for generating a clock signal, comprising:
    at a root node of a clock distribution network, receiving a first clock signal generated based on a reference clock signal;
    at a first leaf node of a plurality of leaf nodes of the clock distribution network, detecting a reference event associated with the reference clock signal and generating a synchronizing signal based on the detection of the reference event;
    passing the synchronizing signal from the first leaf node to the root node;
    at the root node, generating a second clock signal from the first clock signal synchronized to the synchronizing signal received at the root node, and distributing the second clock signal to the leaf nodes of the clock distribution network, the generating of the second clock signal including selecting a repeating pattern of cycles of the first clock signal, wherein the repeating pattern includes fewer than all of the cycles of the first clock signal, and at least every cycle of the first clock signal that is shifted in time by a propagation delay with respect to a rising edge of the reference clock signal or every cycle of the first clock signal that is shifted in time by a propagation delay with respect to a falling edge of the reference clock signal.

2. The method of claim 1 wherein detecting the reference event includes detecting a rising edge of said reference clock signal or detecting a falling edge of said reference clock signal.

3. The method of claim 2 wherein generating the second clock signal from the first clock signal includes selecting a repeating pattern of cycles of the first clock signal wherein the repeating pattern is synchronized to the received synchronizing signal, the repeating pattern having a length equal to a length of the number of consecutive cycles of the first clock signal in each cycle of the reference clock signal.

4. The method of claim 2 wherein the second clock signal received at the first leaf node has an edge aligned with every rising edge of the reference clock signal or aligned with every falling edge of the reference clock signal.

5. The method of claim 1 wherein generating the second clock signal from the first clock signal includes selecting a repeating pattern of cycles of the first clock signal, wherein the repeating pattern is synchronized to the received synchronizing signal, the repeating pattern having a length N.

6. The method of claim 5 wherein generating the second clock signal includes accepting an input representing a division factor M and determining the repeating pattern of cycles according to the division factor such that a rate of the second clock signal is approximately a rate of the first clock signal divided by the division factor.

7. The method of claim 6 wherein the rate of the second clock signal corresponds to a number of rising edges in the repeating pattern of cycles or a number of falling edges in the repeating pattern of cycles divided by the time duration of the repeating pattern of cycles.

8. The method of claim 5 wherein generating the second clock signal comprises setting a counter to a first value upon receipt of the synchronizing signal, and clocking the counter using the first clock signal in a cyclic sequence of count values, each cycle of length N.

9. Circuitry for generating a clock signal, comprising:
a clock generator having an output that provides a generated clock signal that is generated based on a reference clock signal;
a clock divider having an input coupled to the output of the clock generator and an output coupled to a root node of a clock distribution network having clock distribution paths to a plurality of leaf nodes for distributing a divided clock signal to the leaf nodes;
a synchronizing signal generator coupled to a first leaf node of the plurality of leaf nodes of the clock distribution network; and
a synchronizing signal path from the first leaf node to the root node for passing a synchronizing signal from the first leaf node to the root node;
wherein the synchronizing signal generator has an output coupled to an input of the synchronizing signal path and includes a reference event detection circuit for generating the synchronizing signal in response to a reference event associated with the reference clock signal; and
wherein the clock divider includes an input coupled to the synchronizing signal path, and includes a divided clock generator configured to generate the divided clock signal from the generated clock signal by selecting a repeating pattern of cycles of the generated clock signal, wherein the repeating pattern includes fewer than all of the cycles of the generated clock signal, and at least every cycle of the generated clock signal that is shifted in time by a propagation delay with respect to a rising edge of the reference clock signal or every cycle of the generated clock signal that is shifted in time by a propagation delay with respect to a falling edge of the reference clock signal.

10. The circuitry of claim 9 wherein the reference event includes a rising edge of said reference clock signal or a falling edge of said reference clock signal.

11. The circuitry of claim 10 wherein generating the divided clock signal from the generated clock signal includes selecting a repeating pattern of cycles of the generated clock signal wherein the repeating pattern is synchronized to the synchronizing signal, the repeating pattern having a length equal to a length of the number of consecutive cycles of the generated clock signal in each cycle of the reference clock signal.

12. The circuitry of claim 10 wherein the divided clock signal received at the first leaf node has an edge aligned with every rising edge of the reference clock signal or aligned with every falling edge of the reference clock signal.

13. The circuitry of claim 9 wherein generating the divided clock signal from the generated clock signal includes selecting a repeating pattern of cycles of the generated clock signal, wherein the repeating pattern is synchronized to the received synchronizing signal, the repeating pattern having a length N.

14. The circuitry of claim 13 wherein generating the divided clock signal includes accepting an input representing a division factor M and determining the repeating pattern of cycles according to the division factor such that a rate of the divided clock signal is approximately a rate of the generated clock signal divided by the division factor.

15. The circuitry of claim 14 wherein the rate of the divided clock signal corresponds to a number of rising edges in the repeating pattern of cycles or a number of falling edges in the repeating pattern of cycles divided by the time duration of the repeating pattern of cycles.

16. The circuitry of claim 13 wherein generating the divided clock signal comprises setting a counter to a first value upon receipt of the synchronizing signal, and clocking the counter using the generated clock signal in a cyclic sequence of count values, each cycle of length N.

* * * * *